Sept. 12, 1950        H. D. HUKILL        2,522,228

TRANSMISSION CONTROL MECHANISM

Filed March 18, 1946        2 Sheets-Sheet 1

INVENTOR.
HENRY D. HUKILL
BY
H. O. Clayton
ATTORNEY

Sept. 12, 1950 — H. D. HUKILL — 2,522,228
TRANSMISSION CONTROL MECHANISM
Filed March 18, 1946 — 2 Sheets-Sheet 2

INVENTOR.
HENRY D. HUKILL.
BY
H. O. Clayton
ATTORNEY.

Patented Sept. 12, 1950

2,522,228

UNITED STATES PATENT OFFICE 2,522,228

TRANSMISSION CONTROL MECHANISM

Henry D. Hukill, South Bend, Ind., assignor to Bendix Aviation Corporation, South Bend, Ind., a corporation of Delaware Application March 18, 1946, Serial No. 655,322

2 Claims. (Cl. 192—3.5)

This invention in its broadest aspect relates to new and useful improvements in the power plant of an automotive vehicle.

More specifically, the invention relates to gear shifting mechanism and is of particular utility when employed in connection with speed-changing and direction-reversing transmissions including a synchronizing mechanism, commonly used in coupling internal combustion engines of automotive vehicles with the driving vehicle wheels or other propelling devices.

The principal object of my invention is to provide power operated means for operating a two-speed transmission mechanism mounted at the rear of the main transmission mechanism of the heavy duty type of vehicle, that is a bus or a truck. This two-speed auxiliary transmission of the truck is designed to supplement the main change-speed transmission by providing, in addition to the conventional three-speeds forward and reverse driving ratios, two additional driving ratios between the power plant and the rear wheels. Thus for each of the two settings of the auxiliary transmission there are provided, by the main transmission, four different gear ratios, making eight different ratios in all.

Such a mechanism provides a more efficient power plant, both in climbing hills and on level ground, there being a quiet performance of the motor at relatively high vehicle speeds, and accordingly less wear and tear on the motor parts. On the boulevard or in the country with the vehicle moving at, say twenty to thirty miles per hour, the two-speed transmission may be operated to select its high ratio; thereupon the vehicle continues at the same speed and the motor speed drops, say one-third of its former speed. There is thus provided what is known as an overdrive mechanism that insures a minimum of noise and vibration, saves wear and tear on moving parts, and in general prolongs the life not only of the motor but of the entire automobile.

Other objects of the invention and desirable details of construction and combination of parts will become apparent from the following description of a preferred embodiment, which description is taken in conjunction with the accompanying drawings, in which.

Figure 1:
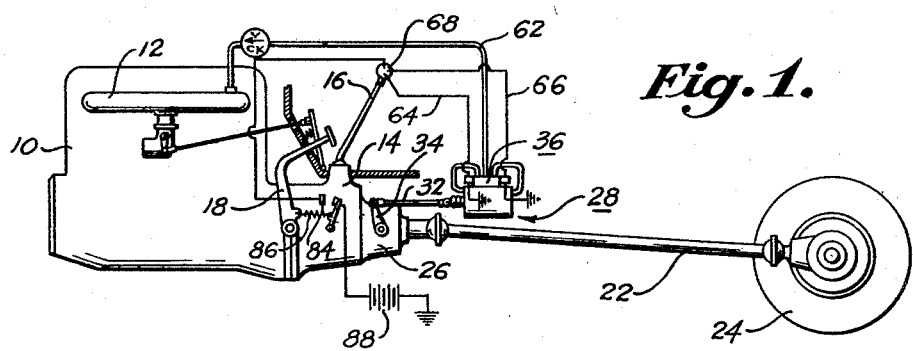
Figure 1 is a diagrammatic view of one embodiment of the transmission operating mechanism constituting my invention.

Referring to the modification of the invention of Figure 1 of the drawings, there are diagrammatically disclosed certain of the elements of the vehicle power plant, including an internal combustion engine 10 having an intake manifold 12, a conventional three-speeds forward and reverse transmission 14 operable by a gear shift lever 16, manual clutch pedal 18 for operating a conventional friction clutch interposed in the drive connection beyond the engine and transmission, a propeller shaft 22 drivably connected to the rear wheels of the vehicle one of which is indicated by the reference numeral 24, and a two-speed auxiliary transmission mechanism 26 which may be mounted immediately to the rear of the transmission 14. This auxiliary transmission 26, which is operatively connected to the transmission 14, may of course be housed within the rear end of the casing of the latter transmission.

Describing now the principal feature of my invention, there is provided a double-acting differential pressure motor 28, the power element 30 of which is operably connected, by a rod 32, to a transmission operating crank 34; and rotation of said crank serves to establish the auxiliary transmission in one or the other of its two settings. The motor 28 is controlled by a double three-way or oft called five-way valve 36 which is disclosed in detail in Figure 2 of the drawings. This control valve includes a casing 38 secured to the casing 40 of the motor 28, said valve casing being bored to receive a spool-shaped valve member 42. To the large diametered portions of the latter member there are connected pins 44 and 46 which are connected respectively to the armature of solenoids 48 and 50. When both solenoids are deenergized, then the valve 42 is moved, by one or the other of solenoid springs, not shown, to its transmission neutral position, that is the position disclosed in Figure 2; and as will be noted from an inspection of said figure, in this position of the valve member 42 compartments 53 and 55 of the motor are both connected to the intake manifold. The motor 28 is therefore defined as being of a vacuum suspended type. The valve casing 38 is ported at 52, 54 and 56, the two latter ports being connected respectively, by conduits 58 and 60, to the ends of the motor 28; and the port 52 is connected by a conduit 62, to the intake manifold 12.

Figure 2:
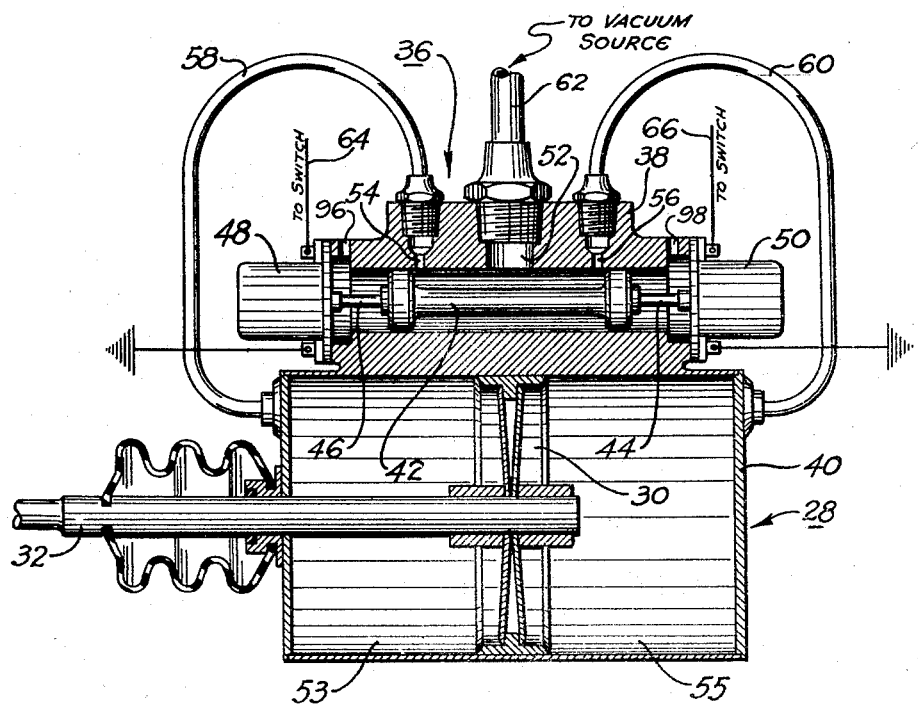
Figure 2 is a sectional view of the power means and the double three-way selector valve for in part controlling the transmission operating power means of the mechanism of Figure 1.

As is disclosed in Figure 2, the solenoids 48 and 50 are electrically grounded and are wired, by wires 64 and 66 respectively, to a manually operated selector switch 68 which is preferably mounted in the end of the gear shift lever 16. As is disclosed in Figure 3, the switch 68 is mounted within a recess in a ball-shaped member 70 which is preferably detachably mounted on the upper end of the lever 16. Switch contact members 72 and 74 are connected respectively to the wires 66 and 64 and contacts 76 and 78, mounted on a lever member 80 of conductive material, are movable into contact with said contacts 72 and 74. The hot wire 82 of the switch mechanism is connected to the lever 80, said wire being connected at its other end to the fixed contact of a clutch-pedal operated breaker switch 84. The movable contact of said breaker switch is connected by a yieldable connection 86 with the clutch pedal 18 and is wired to a grounded battery 88. It is apparent, therefore, from an inspection of Figure 1 that the clutch pedal must be moved to its clutch disengaged position to effect a closing of the switch 84. It follows, therefore, that the solenoids 48 and 50 may not be operated to effect an operation of the valve 36 unless the clutch is disengaged. There is thus provided a mechanism whereby the auxiliary transmission operating shift mechanism of my invention may not be operated until after the driving torque of the power plant has been reversed.

Describing now the operation of the above described shifter mechanism, it will be assumed that the vehicle is in motion and that the transmissions 14 and 26 are established respectively in their high and low gear settings. Should the driver then wish to place the auxiliary transmission 26 in its high gear or oft called overdrive setting, he will first release the accelerator to idle the engine and will then depress the clutch pedal to disengage the friction clutch. This operation serves to disconnect the engine from the transmissions 14 and 26 and makes possible an operation of one or the other or both of said transmissions.

Now the parts of the mechanism of my invention are preferably so constructed and arranged that the piston 30 must be moved to the right, Figure 2, to effect the up-shift, that is, high gear operation of the auxiliary transmission 26. The driver, to effect this operation, moves the switch lever 80 counterclockwise in Figure 3 to move the contact 76 into contact with the contact 72; and this operation effects an energization of the solenoid 50, thereby moving the valve member 42 to the right, Figure 3. Air is then admitted to the compartment 53 of the motor 28 via a valve port 96, the interior of the valve casing, the valve port 54 and the conduit 58. During this operation the compartment 55 of the motor remains connected with the intake manifold; accordingly, it follows that the piston 30 is then subjected to a differential of pressures resulting in the movement of the same to the right, Figure 3, to effect the high gear operation of the auxiliary transmission.

The up-shift operation of the auxiliary transmission having been completed, the driver then re-engages the friction clutch by releasing the clutch pedal and then depresses the accelerator to speed up the engine to continue the forward drive of the vehicle; and it is to be noted that the release of the clutch pedal serves to break the switch 84, thereby de-energizing the solenoid 50. The return spring, not shown, within the latter solenoid then serves to return the valve member 42 to its transmission neutral position shown in Figure 2. The piston 30 does not, by this operation of the valve, return to its transmission neutral position inasmuch as the auxiliary transmission is then established in high gear.

Figure 3:
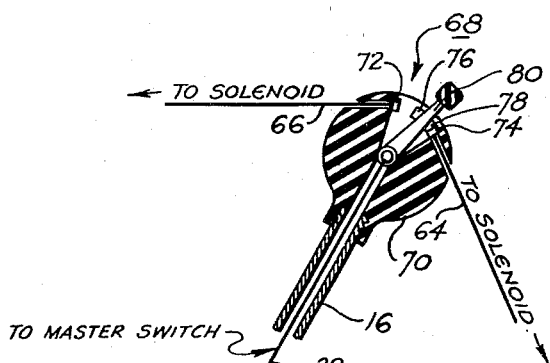
Figure 3 is a sectional view of the gear shift lever mounted valve control switch of the mechanism of Figure 1.

Should it be desired to return the auxiliary transmission to its low gear setting, say to facilitate the climbing of a mountain, the driver will, after releasing the accelerator and disengaging the clutch, move the selector lever 80 back to the position disclosed in Figure 3; and this operation closes the switch 74, 78 resulting in an energization of the solenoid 48 to move the valve member 42 to the left of the position disclosed in Figure 2. The motor compartment 55 is then vented to the atmosphere via a valve port 98, the interior of the valve casing, the valve port 56 and the conduit 60; and this operation results in a movement of the piston 30 to the left, Figure 2, to establish the auxiliary transmission in its low gear setting.

Figure 4:
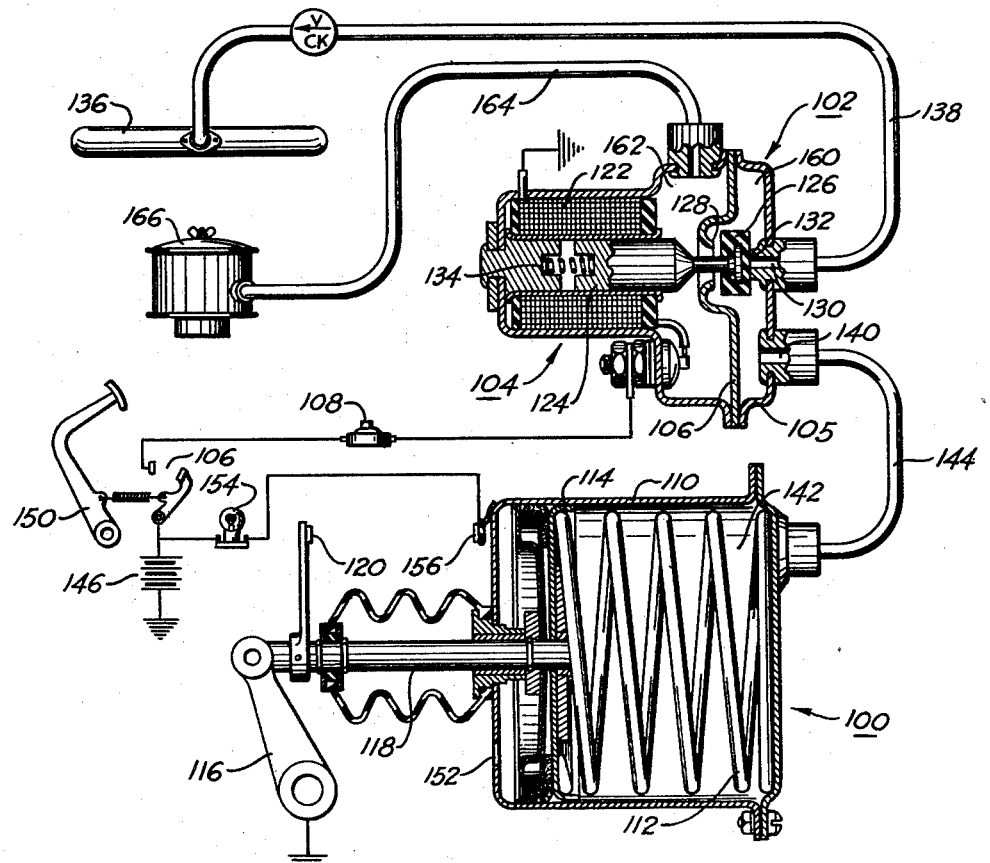
Figure 4 is a diagrammatic view of another embodiment of the transmission operating mechanism of my invention.

There is disclosed in Figure 4 another embodiment of my invention, the principal elements of which includes a spring and differential pressure operated motor 100 controlled by a solenoid operated three-way valve 102, the solenoid 104 for operating said valve being controlled by a clutch pedal operated breaker switch 106 and a manually operated selector switch 108. The latter switch is preferably mounted within easy reach of the driver, say in the instrument panel of the driver's compartment or on the end of the gear shift lever within said compartment.

Describing the details of the shift mechanism of Figure 4, the motor casing 110 houses a spring 112 which biases a piston 114 of the motor to the position disclosed in Figure 4; that is, the low gear position of said piston. An electrically grounded transmission operating lever 116 is connected to the piston 114 by means of a rod 118, and there is mounted on said rod a switch contact member 120. Describing the three-way valve 102, the same includes a two-part casing 105, a partition member 106 being clamped between the casing parts; and the grounded solenoid 104, which is mounted on the valve casing, includes a winding 122 and an armature 124. A valve member 126 is secured to one end of the armature 124, said member seating at 128 to open a vacuum port 130 when the solenoid is energized, and seating at 132 by the operation of a spring 134 when the solenoid is de-energized. The intake manifold 136 of the internal combustion engine is connected to the aforementioned vacuum port 130 by means of a conduit 138 and a valve port 140 is connected to a motor compartment 142 by means of a conduit 144. As to the electrical means for operating the solenoid 104, a grounded battery 146 is wired to the movable contact of the breaker switch 106, said contact being operated by a clutch pedal 150. The fixed contact of said breaker switch is wired to the aforementioned manually operated cut-in switch 108, said switch being wired to the winding 122 of the grounded solenoid.

Describing now the operation of the auxiliary transmission operating shifter mechanism of Figure 4, it will be assumed that said transmission is established in its low gear setting and that the driver desires an up-shift; that is, high gear operation of said transmission. He will then, after disengaging the clutch to close the switch 100 and reverse the driving torque, close the switch 108; and these operations will result in an energization of the solenoid 104. The valve member 126 is thus seated at 128, thereby interconnecting the intake manifold 136 with the motor compartment 142; and this operation results in a vacuum operation of the motor 100 to effect a high gear setting of the transmission, the piston 114 moving to the right to compress the spring 112. Now this operation of the piston is effected inasmuch as the same is then subjected to a differential of pressures, the right face of the piston being subjected to the relatively low gaseous pressure of the motor compartment 142 and the left face of said piston being subjected, by virtue of an opening 152 in the end wall of the motor, to the pressure of the atmosphere.

Now, with the mechanism of my invention, the driver is advised of the completion of the above described high gear operation of the motor 100 by means of the lighting of an electric lamp 154; for when the piston 114 has moved to its high gear position, the aforementioned grounded switch contact member 120 abuts a fixed contact member 156 mounted on the motor casing. The latter contact member is wired to the lamp 154, which is in turn wired to the grounded battery 146. It is apparent, therefore, that when the motor 100 is vacuum energized to establish the transmission in its high gear setting, the signal lamp 154 is lighted to advise the driver of said setting.

Now, the transmission remains in its high gear setting so long as the internal combustion engine is driving the car forwardly with the transmission established in said setting, that is so long as the gear teeth are subjected to a torque load. To operate the shifter mechanism of Figure 4 to establish the transmission in its low gear setting, the driver needs but to disengage the clutch to reverse the engine torque, it being assumed of course that the switch 108 is at the time open. The motor compartment 142 is at this time vented to the atmosphere via the conduit 144, compartments 160 and 162 in the valve casing, a conduit 164, and an air cleaner 166. Immediately upon reversing the engine torque as described above, the spring 112 by its expanding action moves the piston 114 to the left, Figure 4, to effect the low gear setting of the auxiliary transmission.

There is thus provided a simple and effective shifter mechanism for operating the two-speed auxiliary transmission of an automotive vehicle; and with both embodiments of my invention, the clutch pedal and a manually operated selector switch provide control means for controlling the operation of said mechanism. With both embodiments of my invention, the power element of the motor of the shifter mechanism is power operated in one or the other of two directions to establish the transmission in its two settings. If desired, a check valve may be incorporated in the connection between the intake manifold and the motor, said valve serving to insure a completion of the vacuum operation of the shifter motor despite an increase in intake manifold pressure resulting from a depression of the accelerator while said operation of the motor is being effected.

Although particular embodiments of my invention have been described, it will be understood by those skilled in the art that the object of the invention may be attained by the use of constructions different in certain repects from those disclosed without departing from the underlying principles of the invention. I, therefore, desire by the following claims to include within the scope of my invention all such variations and modifications by which substantially the results of my invention may be obtained through the use of substantially the same or equivalent means.

I claim:

1. For use in an automotive vehicle provided with an internal combustion engine, a friction clutch, means for operating the clutch, a change-speed transmission and an auxiliary two-speed transmission directly connected to said change-speed transmission; power means for operating the two-speed transmission comprising a spring and differential pressure operated motor which may be energized either by an operation of a spring or by subjecting the power element of the motor to a differential of pressures, for establishing said transmission in either one or the other of its two settings, means, including a three-way valve, for controlling the operation of said motor, and electrical means for controlling the operation of said last mentioned means including manually operated switch means comprising a switch which is adapted to be closed, to effect a pressure differential operated energization of the motor, when the clutch operating means is operated to disengage the clutch.

2. For use in an automotive vehicle provided with an internal combustion engine, a friction clutch, means for operating the clutch including a clutch pedal, a change-speed transmission and an auxiliary two-speed transmission directly connected to said change-speed transmission; power means for operating the two-speed transmission comprising a spring and differential pressure operated motor which may be energized to establish said transmission in either one or the other of its two settings, valve means for controlling the operation of said motor and electrical means, including a clutch pedal operated switch, a manually operated selector switch and a valve operating solenoid, for controlling the operation of said valve means, said switches and solenoid being connected in series with each other the clutch pedal operated switch being closed when the clutch pedal is depressed to disengage the clutch.

HENRY D. HUKILL.

REFERENCES CITED

The following references are of record in the file of this patent:

UNITED STATES PATENTS

| Number | Name | Date |
| --- | --- | --- |
| Re. 21,844 | Vetter | June 24, 1941 |
| 2,231,966 | Swennes | Feb. 18, 1941 |
| 2,349,297 | Neracher et al. | May 23, 1941 |
| 2,365,732 | Snow | Dec. 26, 1944 |
| 2,426,234 | Neracher et al. | Aug. 26, 1947 |